(12) United States Patent
Wu

(10) Patent No.: US 8,652,628 B2
(45) Date of Patent: *Feb. 18, 2014

(54) FUSER MEMBER

(75) Inventor: Jin Wu, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 476 days.

This patent is subject to a terminal disclaimer.

(21) Appl. No.: 13/072,011

(22) Filed: Mar. 25, 2011

(65) Prior Publication Data

US 2012/0244345 A1   Sep. 27, 2012

(51) Int. Cl.
B32B 27/08   (2006.01)

(52) U.S. Cl.
USPC ........... 428/220; 428/421; 428/422; 428/447; 428/451; 428/473.5

(58) Field of Classification Search
USPC .............. 428/220, 421, 422, 447, 451, 473.5
See application file for complete search history.

(56) References Cited

U.S. PATENT DOCUMENTS 8,153,213 B2 * 4/2012 Wu ............................. 428/32.51

* cited by examiner

*Primary Examiner* — D. S. Nakarani
(74) *Attorney, Agent, or Firm* — Hoffman Warnick LLC

(57) ABSTRACT

The present teachings provide a fuser member. The fuser member includes a substrate layer comprising a polymer blend polyimide polymer and amino silicone.

20 Claims, 3 Drawing Sheets

FUSER MEMBER

BACKGROUND

1. Field of Use

This disclosure is generally directed to fuser members useful in electrophotographic imaging apparatuses, including digital, image on image, and the like. In addition, the fuser member described herein can also be used in a transfix apparatus in a solid ink jet printing machine.

2. Background

Centrifugal molding is used to obtain seamless polyimide belts useful as fuser members. Typically, a thin fluorine or silicone release layer is applied to the inner surface of a rigid cylindrical mandrel. A polyimide coating is applied to the inner surface of the mandrel containing the release layer. The polyimide is cured and then released from the mandrel. This process results in a high unit manufacturing cost for the final fuser belt.

There are drawbacks to this process. The length of the polyimide belt is determined by the size of the mandrel. The requirement of a release layer on the inner surface of the mandrel is an additional process step. For fuser belts manufactured in this manner the cost is expensive. There is a need to reduce the manufacturing cost.

In addition, a polyimide fuser belt requires a modulus that is greater than 4,000 MPa. It is preferable the onset decomposition temperature be greater than 400° C. Such requirements, along with reduced cost of manufacturing are desirable.

SUMMARY

According to an embodiment, a fuser member is provided. The fuser member includes a substrate layer comprising a polyimide polymer and amino silicone.

According to another embodiment, there is described a fuser member including a substrate layer comprising a polyimide polymer and amino silicone. Disposed on the substrate layer is an intermediate layer comprising a material selected from the group consisting of silicone and fluoroelastomer. A fluoropolymer release layer is disposed on the intermediate layer.

According to another embodiment there is provided a composition of a fuser member comprising a layer comprising a polymer blend of polyimide and amino silicone, represented by the structures selected from the group consisting of

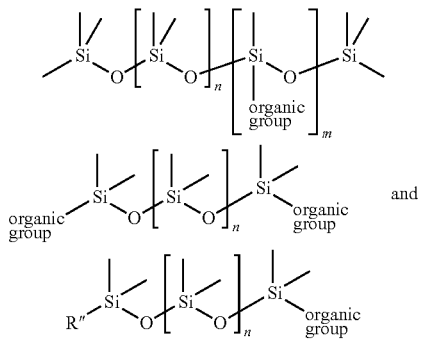

wherein the organic group is one of —$RNH_2$, —$RNHR'NH_2$; R, R' and R" each represent an alkyl having from about 1 to about 8 carbon atoms; n is from about 1 to about 100 and m is from about 1 to about 100.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

Figure 1:
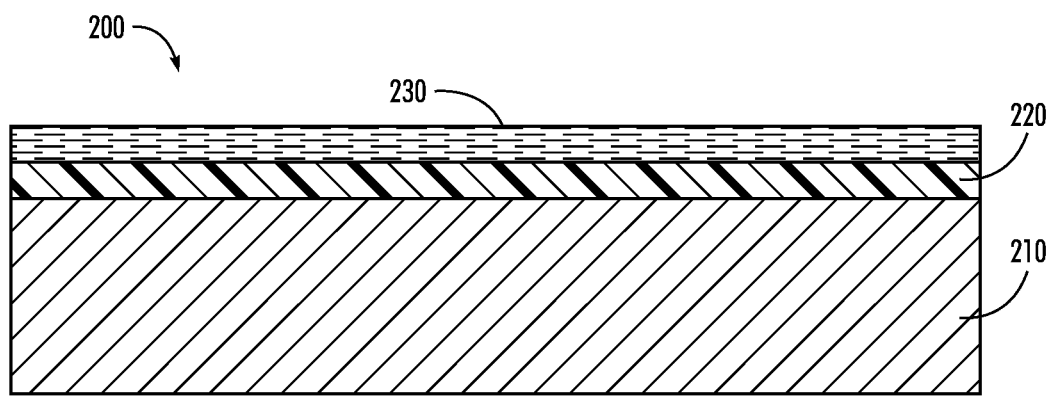
FIG. 1 depicts an exemplary fuser member having a belt substrate in accordance with the present teachings.

It should be noted that some details of the figures have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Furthermore, to the extent that the terms "including", "includes", "having", "has", "with", or variants thereof are used in either the detailed description and the claims, such terms are intended to be inclusive in a manner similar to the term "comprising." The term "at least one of" is used to mean that one or more of the listed items can be selected.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

The fuser or fixing member can include a substrate having one or more functional intermediate layers formed thereon. The substrate described herein includes a belt. The one or more intermediate layers include cushioning layers and release layers. Such fuser member can be used as an oil-less fusing member for high speed, high quality electrophotographic printing to ensure and maintain a good toner release from the fused toner image on an image supporting material (e.g., a paper sheet), and further assist paper stripping.

In various embodiments, the fuser member can include, for example, a substrate, with one or more functional intermediate layers formed thereon. The substrate can be formed in various shapes, such as a belt, or a film, using suitable materials that are non-conductive or conductive depending on a specific configuration, for example, as shown in FIG. 1.

In FIG. 1, an exemplary embodiment of a fusing or transfix member 200 can include a belt substrate 210 with one or more functional intermediate layers, e.g., 220 and an outer surface layer 230 formed thereon. The outer surface layer 230 is also referred to as a release layer. The belt substrate 210 is described further and is made of a polyimide polymer and an amino silicone.

Functional Intermediate Layer

Examples of materials used for the functional intermediate layer 220 (also referred to as cushioning layer or intermediate layer) include fluorosilicones, silicone rubbers such as room temperature vulcanization (RTV) silicone rubbers, high temperature vulcanization (HTV) silicone rubbers, and low temperature vulcanization (LTV) silicone rubbers. These rubbers are known and readily available commercially, such as SILASTIC® 735 black RTV and SILASTIC® 732 RTV, both from Dow Corning; 106 RTV Silicone Rubber and 90 RTV Silicone Rubber, both from General Electric; and JCR6115CLEAR HTV and SE4705U HTV silicone rubbers from Dow Corning Toray Silicones. Other suitable silicone materials include siloxanes (such as polydimethylsiloxanes); fluorosilicones such as Silicone Rubber 552, available from Sampson Coatings, Richmond, Va.; liquid silicone rubbers such as vinyl crosslinked heat curable rubbers or silanol room temperature crosslinked materials; and the like. Another specific example is Dow Corning Sylgard 182. Commercially available LSR rubbers include Dow Corning Q3-6395, Q3-6396, SILASTIC® 590 LSR, SILASTIC® 591 LSR, SILASTIC® 595 LSR, SILASTIC® 596 LSR, and SILASTIC® 598 LSR from Dow Corning. The functional layers provide elasticity and can be mixed with inorganic particles, for example SiC or $Al_2O_3$, as required.

Other examples of the materials suitable for use as functional intermediate layer 220 also include fluoroelastomers. Fluoroelastomers are from the class of 1) copolymers of two of vinylidenefluoride, hexafluoropropylene, and tetrafluoroethylene; 2) terpolymers of vinylidenefluoride, hexafluoropropylene, and tetrafluoroethylene; and 3) tetrapolymers of vinylidenefluoride, hexafluoropropylene, tetrafluoroethylene, and a cure site monomer. These fluoroelastomers are known commercially under various designations such as VITON A®, VITON B® VITON E® VITON E 60C®, VITON E430®, VITON 910®, VITON GH®; VITON GF®; and VITON ETP®. The VITON® designation is a trademark of E.I. DuPont de Nemours, Inc. The cure site monomer can be 4-bromoperfluorobutene-1,1,1-dihydro-4-bromoperfluorobutene-1,3-bromoperfluoropropene-1,1,1-dihydro-3-bromoperfluoropropene-1, or any other suitable, known cure site monomer, such as those commercially available from DuPont. Other commercially available fluoropolymers include FLUOREL 2170®, FLUOREL 2174®, FLUOREL 2176®, FLUOREL 2177® and FLUOREL LVS 76®, FLUOREL® being a registered trademark of 3M Company. Additional commercially available materials include AFLAS™ a poly(propylene-tetrafluoroethylene), and FLUOREL II® (LII900) a poly(propylene-tetrafluoroethylenevinylidenefluoride), both also available from 3M Company, as well as the Tecnoflons identified as FOR-60KIR®, FOR-LHF®, NM® FOR-THF®, FOR-TFS®, TH®, NH®, P757®, TNS®, T439®, PL958®, BR9151® and TN505®, available from Ausimont.

Examples of three known fluoroelastomers are (1) a class of copolymers of two of vinylidenefluoride, hexafluoropropylene, and tetrafluoroethylene, such as those known commercially as VITON A®; (2) a class of terpolymers of vinylidenefluoride, hexafluoropropylene, and tetrafluoroethylene known commercially as VITON B®; and (3) a class of tetrapolymers of vinylidenefluoride, hexafluoropropylene, tetrafluoroethylene, and a cure site monomer known commercially as VITON GH® or VITON GF®.

The fluoroelastomers VITON GH® and VITON GF® have relatively low amounts of vinylidenefluoride. VITON GF® and VITON GH® have about 35 weight percent of vinylidenefluoride, about 34 weight percent of hexafluoropropylene, and about 29 weight percent of tetrafluoroethylene, with about 2 weight percent cure site monomer.

The thickness of the functional intermediate layer 220 is from about 30 microns to about 1,000 microns, or from about 100 microns to about 800 microns, or from about 150 to about 500 microns.

Release Layer

An exemplary embodiment of a release layer 230 includes fluoropolymer particles. Fluoropolymer particles suitable for use in the formulation described herein include fluorine-containing polymers. These polymers include fluoropolymers comprising a monomeric repeat unit that is selected from the group consisting of vinylidene fluoride, hexafluoropropylene, tetrafluoroethylene, perfluoroalkylvinylether, and mixtures thereof. The fluoropolymers may include linear or branched polymers, and cross-linked fluoroelastomers. Examples of fluoropolymer include polytetrafluoroethylene (PTFE); perfluoroalkoxy polymer resin (PFA); copolymer of tetrafluoroethylene (TFE) and hexafluoropropylene (HFP); copolymers of hexafluoropropylene (HFP) and vinylidene fluoride (VDF or VF2); terpolymers of tetrafluoroethylene (TFE), vinylidene fluoride (VDF), and hexafluoropropylene (HFP); and tetrapolymers of tetrafluoroethylene (TFE), vinylidene fluoride (VF2), and hexafluoropropylene (HFP), and mixtures thereof. The fluoropolymer particles provide chemical and thermal stability and have a low surface energy. The fluoropolymer particles have a melting temperature of from about 255° C. to about 360° C. or from about 280° C. to about 330° C. These particles are melted to form the release layer.

For the fuser member 200, the thickness of the outer surface layer or release layer 230 can be from about 10 microns to about 100 microns, or from about 20 microns to about 80 microns, or from about 40 microns to about 60 microns.

Adhesive Layer(s)

Optionally, any known and available suitable adhesive layer, also referred to as a primer layer, may be positioned between the release layer 230, the functional intermediate layer 220 and the substrate 210. Examples of suitable adhesives include silanes such as amino silanes (such as, for example, HV Primer 10 from Dow Corning), titanates, zirconates, aluminates, and the like, and mixtures thereof. In an embodiment, an adhesive in from about 0.001 percent to about 10 percent solution can be wiped on the substrate. The adhesive layer can be coated on the substrate, or on the outer layer, to a thickness of from about 2 nanometers to about 2,000 nanometers, or from about 2 nanometers to about 500 nanometers. The adhesive can be coated by any suitable known technique, including spray coating or wiping.

Figure 2A:
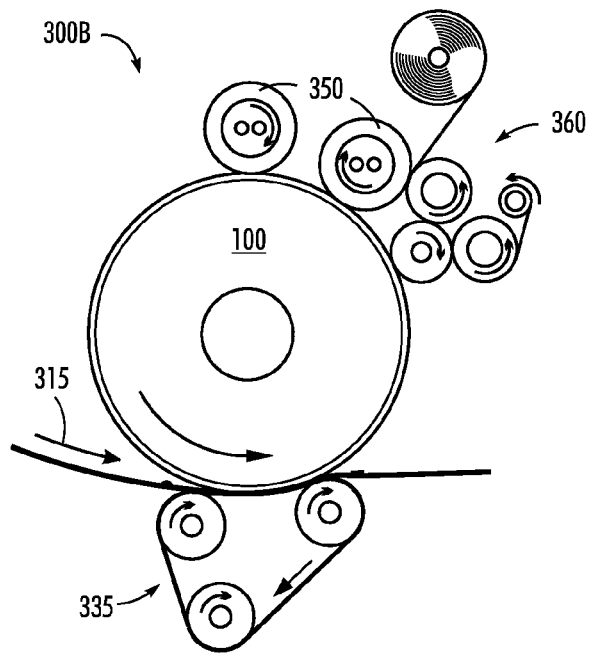
FIGS. 2A-2B depict exemplary fusing configurations using the fuser member shown in FIG. 1 in accordance with the present teachings.
Figure 2B:
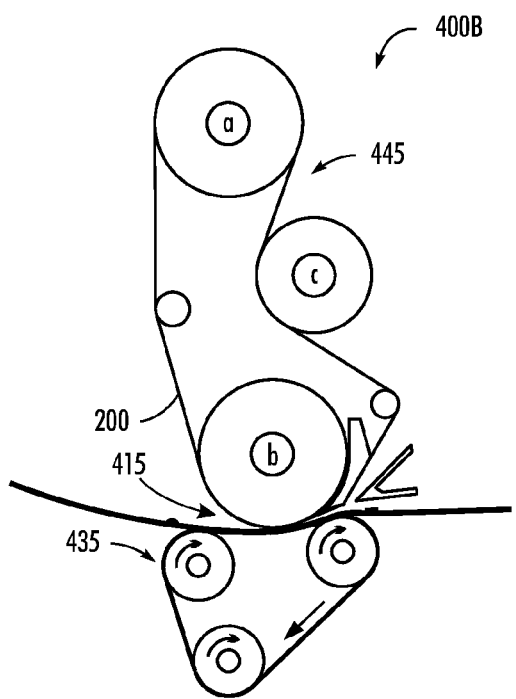

FIGS. 2A and 2B depict an exemplary fusing configuration for the fusing process in accordance with the present teachings. It should be readily apparent to one of ordinary skill in the art that the fusing configurations 300B and 400B depicted in FIGS. 2A-2B, respectively, represent generalized schematic illustrations and that other members/layers/substrates/configurations can be added or existing members/layers/substrates/configurations can be removed or modified. Although an electrophotographic printer is described herein, the disclosed apparatus and method can be applied to other printing technologies. Examples include offset printing and inkjet and solid transfix machines.

FIG. 2A depicts the fusing configuration 300B using a fuser belt shown in FIG. 1 in accordance with the present teachings. The configuration 300B can include a fuser belt of FIG. 1 that forms a fuser nip with a pressure applying mechanism 335, such as a pressure belt, for an image supporting material 315. In various embodiments, the pressure applying mechanism 335 can be used in combination with a heat lamp (not shown) to provide both the pressure and heat for the fusing process of the toner particles on the image supporting material 315. In addition, the configuration 300B can include one or more external heat rolls 350 along with, e.g., a cleaning web 360, as shown in FIG. 2A.

FIG. 2B depicts the fusing configuration 400B using a fuser belt shown in FIG. 1 in accordance with the present teachings. The configuration 400B can include a fuser belt (i.e., 200 of FIG. 1) that forms a fuser nip with a pressure applying mechanism 435, such as a pressure belt in FIG. 2B, for a media substrate 415. In various embodiments, the pressure applying mechanism 435 can be used in a combination with a heat lamp to provide both the pressure and heat for the fusing process of the toner particles on the media substrate 415. In addition, the configuration 400B can include a mechanical system 445 to move the fuser belt 200 and thus fusing the toner particles and forming images on the media substrate 415. The mechanical system 445 can include one or more rolls 445a-c, which can also be used as heat rolls when needed.

Figure 3:
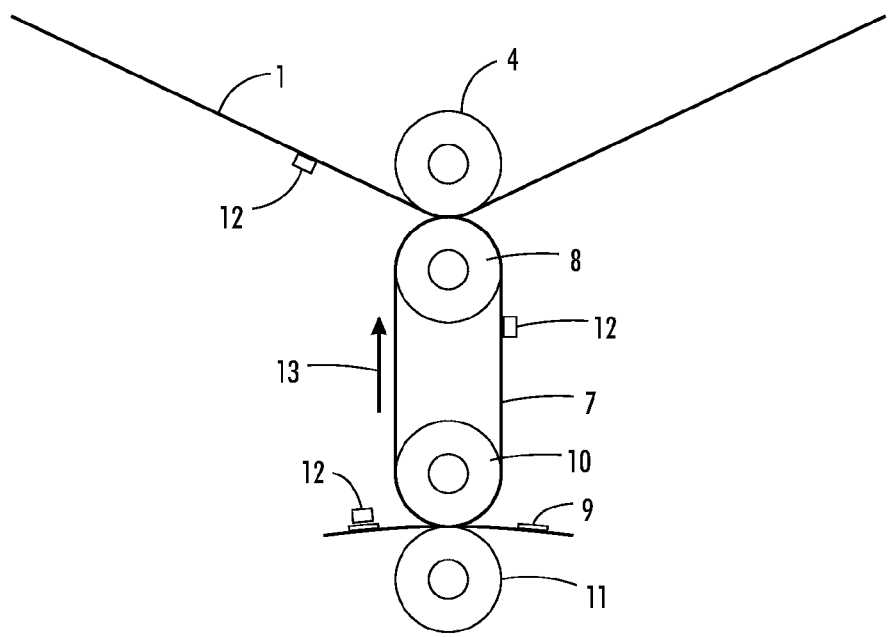
FIG. 3 depicts a fuser configuration using a transfix apparatus.

FIG. 3 demonstrates a view of an embodiment of a transfix member 7 which may be in the form of a belt, sheet, film, or like form. The transfix member 7 is constructed similarly to the fuser belt described above. The developed image 12 positioned on intermediate transfer member 1, is brought into contact with and transferred to transfix member 7 via rollers 4 and 8. Roller 4 and/or roller 8 may or may not have heat associated therewith. Transfix member 7 proceeds in the direction of arrow 13. The developed image is transferred and fused to a copy substrate 9 as copy substrate 9 is advanced between rollers 10 and 11. Rollers 10 and/or 11 may or may not have heat associated therewith.

Described herein is a polyimide composition suitable for use as a substrate layer 210 of FIG. 1. The polyimide composition includes an internal release agent that self releases from a metal substrate such as stainless steel. The polyimide composition comprises a polyamic acid and an internal release agent of an amino silicone that self-releases from a metal substrate such as stainless steel. Most references report applying an external release layer on the metal substrate before coating the polyimide layer and then releasing it. The disclosed composition is cost effective since only one coating layer is needed.

Substrate Layer

The substrate layer 210 disclosed herein is a polyimide composition comprising an internal release agent of amino silicone that self-releases from a metal substrate such as stainless steel. The prior art teaches applying an external release layer on the metal substrate before coating the polyimide layer, and then releasing it. The disclosed composition is cost effective since only one coating layer is needed.

The disclosed polyamic acid includes one of a polyamic acid of pyromellitic dianhydride/4,4'-oxydianiline, a polyamic acid of pyromellitic dianhydride/phenylenediamine, a polyamic acid of biphenyl tetracarboxylic dianhydride/4,4'-oxydianiline, a polyamic acid of biphenyl tetracarboxylic dianhydride/phenylenediamine, a polyamic acid of benzophenone tetracarboxylic dianhydride/4,4'-oxydianiline, a polyamic acid of benzophenone tetracarboxylic dianhydride/4,4'-oxydianiline/phenylenediamine, and the like and mixtures thereof.

Commercial examples of polyamic acid of pyromellitic dianhydride/4,4-oxydianiline include PYRE-ML RC5019 (about 15-16 weight percent in N-methyl-2-pyrrolidone, NMP), RC5057 (about 14.5-15.5 weight percent in NMP/aromatic hydrocarbon=80/20), and RC5083 (about 18-19 weight percent in NMP/DMAc=15/85), all from Industrial Summit technology Corp., Parlin, N.J.; and DURIMIDE® 100, commercially available from FUJIFILM Electronic Materials U.S.A., Inc.

Commercial examples of polyamic acid of biphenyl tetracarboxylic dianhydride/4,4'-oxydianiline include U-VARNISH A and S (about 20 weight in NMP), both from UBE America Inc., New York, N.Y.

Commercial examples of polyamic acid of biphenyl tetracarboxylic dianhydride/phenylenediamine include PI-2610 (about 10.5 weight in NMP) and PI-2611 (about 13.5 weight in NMP), both from HD MicroSystems, Parlin, N.J.

Commercial examples of polyamic acid of benzophenone tetracarboxylic dianhydride/4,4'-oxydianiline include RP46 and RP50 (about 18 weight percent in NMP), both from Unitech Corp., Hampton, Va.

Commercial examples of polyamic acid of benzophenone tetracarboxylic dianhydride/4,4'-oxydianiline/phenylenediamine include PI-2525 (about 25 weight percent in NMP), PI-2574 (about 25 weight percent in NMP), PI-2555 (about 19 weight percent in NMP/aromatic hydrocarbon=80/20), and PI-2556 (about 15 weight percent in NMP/aromatic hydrocarbon/propylene glycol methyl ether=70/15/15), all from HD MicroSystems, Parlin, N.J.

Various amounts of polyamic acid can be selected for the substrate, such as for example, from about 90 to about 99.9 weight percent, from about 95 to about 99.8 weight percent, or from about 97 to about 99.5 weight percent.

Other polyamic acid or ester of polyamic acid examples that can be included in the intermediate transfer member are from the reaction of a dianhydride and a diamine. Suitable dianhydrides include aromatic dianhydrides and aromatic tetracarboxylic acid dianhydrides such as, for example, 9,9-bis(trifluoromethyl)xanthene-2,3,6,7-tetracarboxylic acid dianhydride, 2,2-bis(3,4-dicarboxyphenyl)hexafluoropropane dianhydride, 2,2-bis((3,4-dicarboxyphenoxy)phenyl)hexafluoropropane dianhydride, 4,4'-bis(3,4-dicarboxy-2,5,6-trifluorophenoxy)octafluorobiphenyl dianhydride, 3,3',4,4'-tetracarboxybiphenyl dianhydride, 3,3',4,4'-tetracarboxybenzophenone dianhydride, di-(4-(3,4-dicarboxyphenoxy)phenyl)ether dianhydride, di-(4-(3,4-dicarboxyphenoxy)phenyl) sulfide dianhydride, di-(3,4-dicarboxyphenyl)methane dianhydride, di-(3,4-dicarboxyphenyl)ether dianhydride, 1,2,4,5-tetracarboxybenzene dianhydride, 1,2,4-tricarboxybenzene dianhydride, butanetetracarboxylic dianhydride, cyclopentanetetracarboxylic dianhydride, pyromellitic dianhydride, 1,2,3,4-benzenetetracarboxylic dianhydride, 2,3,6,7-naphthalenetetracarboxylic dianhydride, 1,4,5,8-naphthalenetetracarboxylic dianhydride, 1,2,5,6-naphthalenetetracarboxylic dianhydride, 3,4,9,10-perylenetetracarboxylic dianhydride, 2,3,6,7-anthracene tetracarboxylic dianhydride, 1,2,7,8-phenanthrenetetracarboxylic dianhydride, 3,3',4,4'-biphenyltetracarboxylic dianhydride, 2,2',3,3'-biphenyltetracarboxylic dianhydride, 3,3',4-4'-benzophenonetetracarboxylic dianhydride, 2,2',3,3'-benzophenonetetracarboxylic dianhydride, 2,2-bis(3,4-dicarboxyphenyl)propane dianhydride, 2,2-bis(2,3-dicarboxyphenyl)propane dianhydride, bis(3,4-dicarboxyphenyl)ether dianhydride, bis(2,3-dicarboxyphenyl)ether dianhydride, bis(3,4-dicarboxyphenyl)sulfone dianhydride, bis(2,3-dicarboxyphenyl)sulfone 2,2-bis(3,4-dicarboxyphenyl)-1,1,1,3,3,3-hexafluoropropane dianhydride, 2,2-bis(3,4-dicarboxyphenyl)-1,1,1,3,3,3-hexachloropropane dianhydride, 1,1-bis(2,3-dicarboxyphenyl)ethane dianhydride, 1,1-bis(3,4-dicarboxyphenyl)ethane dianhydride, bis(2,3-dicarboxyphenyl)methane dianhydride, bis(3,4-dicarboxyphenyl)methane dianhydride, 4,4'-(p-phenylenedioxy)diphthalic dianhydride, 4,4'-(m-phenylenedioxy)diphthalic dianhydride, 4,4'-diphenylsulfidedioxybis(4-phthalic acid)dianhydride, 4,4'-diphenylsulfonedioxybis(4-phthalic acid)dianhydride, methylenebis(4-phenyleneoxy-4-phthalic acid)dianhydride, ethylidenebis(4-phenyleneoxy-4-phthalic acid)dianhydride, isopropylidenebis-(4-phenyleneoxy-4-phthalic acid)dianhydride, hexafluoroisopropylidenebis(4-phenyleneoxy-4-phthalic acid)dianhydride, and the like. Exemplary diamines suitable for use in the preparation of the polyamic acid include 4,4'-bis-(m-aminophenoxy)-biphenyl, 4,4'-bis-(m-aminophenoxy)-diphenyl sulfide, 4,4'-bis-(m-aminophenoxy)-diphenyl sulfone, 4,4'-bis-(p-aminophenoxy)-benzophenone, 4,4'-bis-(p-aminophenoxy)-diphenyl sulfide, 4,4'-bis-(p-aminophenoxy)-diphenyl sulfone, 4,4'-diamino-azobenzene, 4,4'-diaminobiphenyl, 4,4'-diaminodiphenylsulfone, 4,4'-diamino-p-terphenyl, 1,3-bis-(gamma-aminopropyl)-tetramethyl-disiloxane, 1,6-diaminohexane, 4,4'-diaminodiphenylmethane, 3,3'-diaminodiphenylmethane, 1,3-diaminobenzene, 4,4'-diaminodiphenyl ether, 2,4'-diaminodiphenylether, 3,3'-diaminodiphenylether, 3,4'-diaminodiphenylether, 1,4-diaminobenzene, 4,4'-diamino-2,2',3,3',5,5',6,6'-octafluoro-biphenyl, 4,4'-diamino-2,2',3,3',5,5',6,6'-octafluorodiphenyl ether, bis[4-(3-aminophenoxy)-phenyl]sulfide, bis[4-(3-aminophenoxy)phenyl]sulfone, bis[4-(3-aminophenoxy)phenyl]ketone, 4,4'-bis(3-aminophenoxy)biphenyl, 2,2-bis[4-(3-aminophenoxy)phenyl]-propane, 2,2-bis[4-(3-aminophenoxy)phenyl]-1,1,1,3,3,3-hexafluoropropane, 4,4'-diaminodiphenyl sulfide, 4,4'-diaminodiphenyl ether, 4,4'-diaminodiphenyl sulfone, 4,4'-diaminodiphenylmethane, 1,1-di(p-aminophenyl)ethane, 2,2-di(p-aminophenyl)propane, and 2,2-di(p-aminophenyl)-1,1,1,3,3,3-hexafluoropropane, and the like and mixtures thereof.

The dianhydrides and diamines are, for example, selected in a weight ratio of dianhydride to diamine of from about 20:80 to about 80:20, and more specifically, in an about 50:50 weight ratio. The above aromatic dianhydride like aromatic tetracarboxylic acid dianhydrides and diamines like aromatic diamines are used singly or as a mixture, respectively.

Silicone itself is widely used as releasing agent. However, when mixed with a polyamic acid, it is incompatible with the polyamic acid coating solution (phase separation), and the resulting polyimide shows clear phase separation and the releasing of the polyimide from the coating substrate varies and is very difficult to control. Using a functionalized silicone, such as an amino silicone, which is compatible with the coating solution (clear when mixed), and the resulting polyimide is also clear with no apparent phase separation. In addition, the amino silicone can chemically interact with the polyamic acid, thus be incorporated into the polyimide network. The resulting polyimide self releases from the metal coating substrate consistently.

The amino silicone can be dual end type such as KF-8010 (functional group equivalent weight=430 g/mol), X-22-161B (functional group equivalent weight=1,500 g/mol), or KF-8012 (functional group equivalent weight=2,200 g/mol); or side chain type including mono amino such as KF-864 (functional group equivalent weight=3,800 g/mol), diamino such as KF-393 (functional group equivalent weight=350 g/mol), or KF-861 (functional group equivalent weight=1,600 g/mol), and amino polyether such as X-22-3939A (functional group equivalent weight=1,700 g/mol), all available from Shin Etsu Chemical Co., Ltd., Tokyo, Japan.

Various amounts of amino silicone can be selected for the substrate, such as for example, from about 0.01 to about 5.0 weight percent, from about 0.1 to about 3.0 weight percent, or from about 0.5 to about 2.0 weight percent of the total weight of the substrate.

The amino silicone is represented by the following structures or formulas.

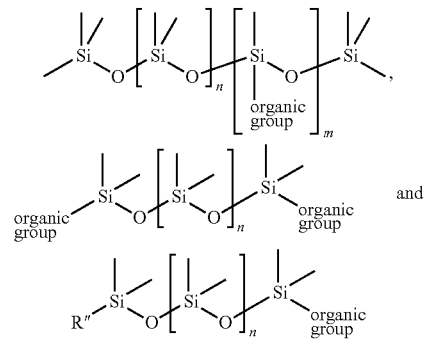

wherein the organic group is one of —$RNH_2$, —$RNHR'NH_2$; R, R' and R" each represent an alkyl having from about 1 to about 8 carbon atoms; n is from about 1 to about 100 and m is from about 1 to about 100.

The polyimide substrate composition can optionally contain a polysiloxane copolymer to enhance or smooth the coating. The concentration of the polysiloxane copolymer is less than about 1 weight percent or less than about 0.01 weight percent. The optional polysiloxane copolymer includes a polyester modified polydimethylsiloxane, commercially available from BYK Chemical with the trade name of BYK® 310 (about 25 weight percent in xylene) and 370 (about 25 weight percent in xylene/alkylbenzenes/cyclohexanone/monophenylglycol=75/11/7/7); a polyether modified polydimethylsiloxane, commercially available from BYK Chemical with the trade name of BYK® 330 (about 51 weight percent in methoxypropylacetate) and 344 (about 52.3 weight percent in xylene/isobutanol=80/20), BYK®-SILCLEAN 3710 and 3720 (about 25 weight percent in methoxypropanol); a polyacrylate modified polydimethylsiloxane, commercially available from BYK Chemical with the trade name of BYK®-SILCLEAN 3700 (about 25 weight percent in methoxypropylacetate); or a polyester polyether modified polydimethylsiloxane, commercially available from BYK Chemical with the trade name of BYK® 375 (about 25 weight percent in Di-propylene glycol monomethyl ether). The polyimide, the amino silicone and the polysiloxane polymer of the substrate are present in a weight ratio of about 99.98/0.01/0.01 to about 94/5/1.

The disclosed polyimide substrate layer 210 possesses a Young's modulus of from about 4,000 MPa to about 10,000 MPa, or from about 5,000 MPa to about 9,000 MPa, or from about 6,000 MPA to about 8,000 MPa; and an onset decomposition temperature of from about 500° C. to about 650° C., or from about 540° C. to about 625° C., or from about 580° C. to about 620° C.

Also described herein is a composition used in a process of preparing a seamless polyimide belt for a fuser belt substrate via flow coating. In a centrifugal molding process, a thin fluorine or silicone release layer is applied on the inside of a rigid cylindrical mandrel, and then the polyimide layer is applied and subsequently cured and released from the mandrel. Using a flow coating process and the disclosed composition eliminates the requirement of an extra release layer, thus reducing manufacturing cost.

The composition of the substrate layer comprises a polyamic acid such as a polyamic acid of pyromellitic dianhydride/4,4-oxydianiline and an internal release agent of a amino silicone. The internal release agent is present in an amount of from about 0.01 weight percent to about 5 weight percent or from about 0.1 weight percent to about 3 weight percent or from about 0.5 weight percent to about 2.0 weight percent of the layer. The amino silicone release agent is needed to fully release the polyimide layer from the stainless steel substrate.

Figure 4:
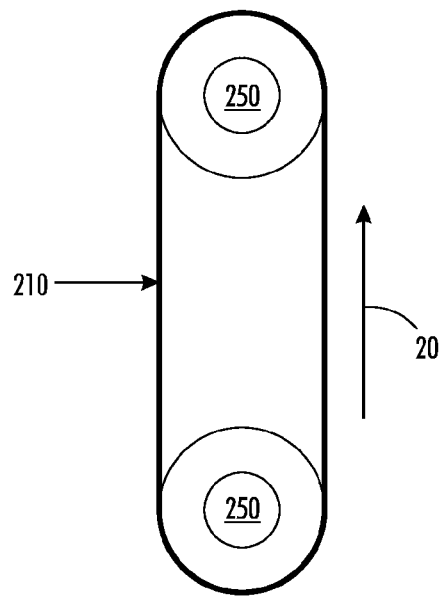
FIG. 4 depicts a tensioning of a fusing member for final curing.

The polyimide-amino silicone composition is flow coated on a welded stainless steel belt or an electroformed seamless nickel belt at the desired product circumference. The polyimide-amino silicone belt is partially cured, or pre-cured, at from about 150° C. to about 250° C., or from about 180° C. to about 220° C. for a time of from about 30 minutes to about 90 minutes, or from about 45 minutes to about 75 minutes, and self releases from the stainless steel belt or electroformed seamless nickel belt, and then is further completely cured at from about 250° C. to about 370° C., or from about 300° C. to about 340° C., for a time of from about 30 minutes to about 150 minutes, or from about 60 minutes to about 120 minutes under tension in the configuration shown in FIG. 4. This final curing is at a tension of from about 1 kilogram to about 10 kilograms. As shown in FIG. 4, the pre-cured belt 210 is tensioned between two rollers 250 while rotating the direction of arrow 20. The final curing produces a belt that exhibits a modulus suitable for use as a fuser member.

The seam thickness and profile of the seamed stainless steel belt can be minimized, and the surface finish and roughness of the substrate belt can be specified. For example, a rough lathed or honed belt is better for the polyimide layer release. Such a configuration easily allows the production of belts of various lengths and widths. Using a rotating mandrel limits the width and length of the belts able to be produced as each belt requires a separate mandrel.

In one embodiment, the coating belt substrate is a rough lathed belt substrate with a $R_a$ (average roughness) of from about 0.01 micron to about 0.5 micron, or from about 0.05 micron to about 0.3 micron, or from about 0.1 micron to about 0.2 micron; and a $R_{max}$ (maximum roughness) or from about 0.05 micron to about 2 micron, or from about 0.1 micron to about 1 micron, or from about 0.2 micron to about 0.7 micron. The back of the polyimide fuser substrate flow coated from this substrate is similarly rough lathed.

In another embodiment, the coating belt substrate is a honed belt substrate with a $R_a$ of from about 0.15 micron to about 1 micron, or from about 0.2 micron to about 0.8 micron, or from about 0.3 micron to about 0.7 micron; and a $R_{max}$ of from about 0.5 micron to about 10 microns, or from about 1 micron to about 7 microns, or from about 2 microns to about 4 microns. The back of the polyimide fuser substrate flow coated from this substrate is similarly honed.

The polyimide-amino silicone layer thickness can be achieved by single pass or multi pass coating. For single pass, the polyimide layer is coated, and pre-cured at a temperature between about 125° C. and about 190° C. for a time of about 30 minutes to about 90 minutes, and then fully cured at a temperature between about 250° C. and about 370° C. for a time of about 30 minutes to about 90 minutes. For multi-pass, such as dual pass, the bottom polyimide layer is coated on a substrate and pre-cured between about 125° C. and about 190° C. for a time of about 30 minutes to about 90 minutes, and the top polyimide layer is subsequently coated and pre-cured between about 125° C. and about 190° C. for a time of about 30 minutes to about 90 minutes, and then the dual layer polyimide layer is fully cured at a temperature between about 250° C. and about 370° C. for a time of about 30 minutes to about 90 minutes. In an embodiment a stainless steel belt is used as the coating substrate. The substrate is rotated at a speed of from about 20 rpm to about 100 rpm, or from about 40 rpm to about 60 rpm during the thermal curing of the coating.

The polyimide-amino silicone substrate composition includes a solvent. Examples of the solvent selected to form the composition include toluene, hexane, cyclohexane, heptane, tetrahydrofuran, methyl ethyl ketone, methyl isobutyl ketone, N,N'-dimethylformamide, N,N'-dimethylacetamide, N-methyl pyrrolidone (NMP), methylene chloride and the like. The solvent is selected, for example, in an amount of from about 70 weight percent to about 95 weight percent, and from 80 weight percent to about 90 weight percent based on the amounts in the coating mixture.

Additives and additional conductive or non-conductive fillers may be present in the above-described composition. In various embodiments, other filler materials or additives including, for example, inorganic particles, can be used for the coating composition and the subsequently formed surface layer. Fillers used herein include carbon blacks such aluminum nitride, boron nitride, aluminum oxide, graphite, graphene, copper flake, nano diamond, carbon black, carbon nanotube, metal oxides, doped metal oxide, metal flake, and mixtures thereof. In various embodiments, other additives known to one of ordinary skill in the art can also be included to form the disclosed composite materials.

The composition is coated on a substrate in any suitable known manner. Typical techniques for coating such materials on the substrate layer include flow coating, liquid spray coating, dip coating, wire wound rod coating, fluidized bed coating, powder coating, electrostatic spraying, sonic spraying, blade coating, molding, laminating, and the like.

Specific embodiments will now be described in detail. These examples are intended to be illustrative, and not limited to the materials, conditions, or process parameters set forth in these embodiments. All parts are percentages by solid weight unless otherwise indicated.

EXAMPLES

A composition comprising polyamic acid of biphenyl tetracarboxylic dianhydride/4,4'-oxydianiline/amino silicone=99.8/0.2 was prepared in NMP at about 16 weight percent solids. The polyamic acid was U-VARNISH S; and the amino silicone was KF-8010. The composition liquid was flow coated on a stainless steel belt substrate, and subsequently cured at 75° C. for 30 minutes, 190° C. for 30 minutes and 320° C. for 60 minutes. The resulting polyimide fuser belt self released from the stainless steel belt substrate, and an 80 µm smooth polyimide belt was obtained.

The polyimide/amino silicone belt was further tested for modulus, and onset decomposition temperature. The modulus was about 5,700 MPa, and the onset decomposition temperature was about 596° C. As comparison, Nitto Denko KUC polyimide belt's modulus is about 6,000 MPa, and its onset decomposition temperature is about 530° C.

The key properties of the disclosed polyimide/amino silicone fuser belt were comparable to those of commercially available polyimide belts, however with lower manufacturing cost due to elimination of the extra release layer coating.

It will be appreciated that variants of the above-disclosed and other features and functions or alternatives thereof may be combined into other different systems or applications. Various presently unforeseen or unanticipated alternatives, modifications, variations, or improvements therein may be subsequently made by those skilled in the art, which are also encompassed by the following claims.

What is claimed is:

1. A fuser member comprising:
a substrate layer comprising a polymer blend of polyimide and amino silicone.

2. The fuser member of claim 1 wherein the amino silicone is represented by structures selected from the group consisting of:

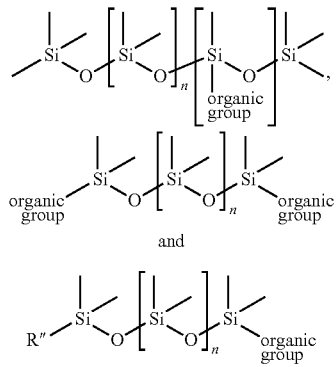

wherein the organic group is one of —RNH$_2$, —RNHR'NH$_2$; R, R' and R" each represent an alkyl having from 1 to 8 carbon atoms; n is an integer from 1 to 100 and m is an integer from 1 to 100.

3. The fuser member of claim 1 wherein the polyimide and the amino silicone are present in a weight ratio of about 99.99/0.01 to about 99/5.

4. The fuser member of claim 1 wherein the substrate layer further comprises a polysiloxane polymer.

5. The fuser member of claim 4 wherein the polysiloxane polymer is selected from the group consisting of a polyester modified polydimethylsiloxane, a polyether modified polydimethylsiloxane, a polyacrylate modified polydimethylsiloxane, and a polyester polyether modified polydimethylsiloxane.

6. The fuser member of claim 4 wherein the polyimide, the amino silicone and the polysiloxane polymer are present in a weight ratio of about 99.98/0.01/0.01 to about 94/5/1.

7. The fuser member of claim 1 wherein the substrate layer further comprises fillers.

8. The fuser member of claim 7 wherein the fillers are selected from the group consisting of aluminum nitride, boron nitride, aluminum oxide, graphite, graphene, copper flake, nano diamond, carbon black, carbon nanotube, metal oxides, doped metal oxide, metal flake, and mixtures thereof.

9. The fuser member of claim 1 further comprising:
an intermediate layer disposed on the substrate layer; and
a release layer disposed on the intermediate layer.

10. The fuser member of claim 9 wherein the intermediate layer comprises silicone.

11. The fuser member of claim 9 further wherein the release layer comprises a fluoropolymer.

12. The fuser member of claim 1 wherein the polyimide comprises from about 99.99 weight percent to about 95.0 weight percent of the polymer blend.

13. The fuser member of claim 1 wherein the substrate layer comprises a thickness of from about 10 microns to about 250 microns.

14. A fuser member comprising:
a substrate layer comprising a polymer blend of polyimide and amino silicone;
an intermediate layer comprising a material selected from the group consisting of silicone and fluoroelastomer; and
a release layer disposed on the intermediate layer comprising a fluoropolymer.

15. The fuser member of claim 14 wherein the amino silicone is represented by structures selected from the group consisting of:

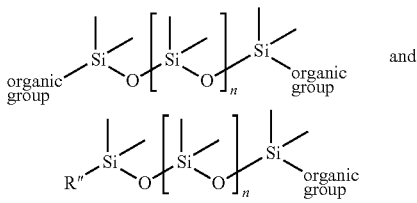

wherein the organic group is one of —RNH$_2$ or —RNHR'NH$_2$; R, R' and R" each represent an alkyl having from 1 to 8 carbon atoms; n is an integer from 1 to 100 and m is an integer from 1 to 100.

16. The fuser member of claim 14 wherein the release layer further comprises fillers.

17. The fuser member of claim 16 wherein the fillers are selected from the group consisting of aluminum nitride, boron nitride, aluminum oxide, graphite, graphene, copper flake, nano diamond, carbon black, carbon nanotube, metal oxides, doped metal oxide, metal flake, and mixtures thereof; and wherein the fluoropolymer comprises a fluoroelastomer or a fluoroplastic.

18. The fuser member of claim 14 further comprising:
an adhesive layer disposed on the intermediate layer or the substrate layer.

19. A fuser member comprising:
a layer comprising a polymer blend of polyimide and amino silicone, represented by structures selected from the group consisting of:

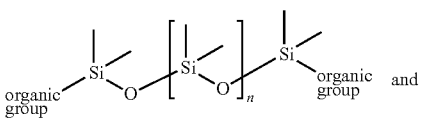

-continued
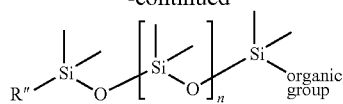
wherein the organic group is one of —RNH$_2$ or —RNHR'NH$_2$; R, R' and R" each represent an alkyl having from 1 to 8 carbon atoms; n is an integer from 1 to 100 and m is an integer from 1 to 100.
20. The fuser member of claim 19 wherein the amino silicone comprises from about 0.01 to about 2.0 weight percent of the polymer blend.
* * * * *